United States Patent
Wu (10) Patent No.: US 6,769,773 B1
(45) Date of Patent: Aug. 3, 2004

(54) PROJECTOR WITH UV LIGHT SOURCE

(76) Inventor: Jiahn-Chang Wu, 15, Lane 13, Alley 439, Her-Chiang Street, Chu-Tung, Hsinchu (TW)

( * ) Notice: Subject to any disclaimer, the term of this patent is extended or adjusted under 35 U.S.C. 154(b) by 0 days.

(21) Appl. No.: 10/441,363

(22) Filed: May 20, 2003

(51) Int. Cl.[7] .................. G03B 21/00; G03B 21/28; G03B 21/14; G02F 1/1335
(52) U.S. Cl. .................. 353/33; 353/122; 353/81; 353/31; 353/84; 349/5
(58) Field of Search .................. 353/122, 30–34, 353/81, 84, 94, 82; 349/5, 7–9

(56) References Cited

U.S. PATENT DOCUMENTS

| | | | | |
|---|---|---|---|---|
| 4,033,683 A | * | 7/1977 | Tancredi | 353/7 |
| 5,779,334 A | * | 7/1998 | Kikinis | 353/31 |
| 6,469,322 B1 | * | 10/2002 | Srivastava et al. | 257/89 |
| 6,508,571 B2 | * | 1/2003 | Chuang | 362/237 |
| 6,552,754 B1 | * | 4/2003 | Song et al. | 348/750 |
| 6,563,626 B1 | * | 5/2003 | Iwasaki | 359/292 |
| 6,583,550 B2 | * | 6/2003 | Iwasa et al. | 313/485 |
| 6,654,171 B1 | * | 11/2003 | Hampel-Vogedes | 359/618 |
| 6,676,260 B2 | * | 1/2004 | Cobb et al. | 353/31 |
| 2002/0008841 A1 | * | 1/2002 | Ohmuro | 349/202 |
| 2002/0180937 A1 | * | 12/2002 | De Vaan et al. | 353/31 |
| 2003/0090632 A1 | * | 5/2003 | Kim et al. | 353/31 |

* cited by examiner

*Primary Examiner*—Russell Adams
*Assistant Examiner*—Andrew Sever
(74) *Attorney, Agent, or Firm*—H. C. Lin (57) ABSTRACT

One or more UV light emitting diode (LED) chip is used as the light source of a picture projection system. The UV LED light is converted into red, green and blue light beams by means of red, green and blue fluorescent plates, respectively. The lights emerging from said fluorescent plates is transmitted through one or more programmable liquid crystal plate or reflected by one or more digital micro-mirror device (DMD) to control the light transmission, and then merged together for projection onto a screen. When only one programmable liquid plate or one DMD is used, the different color signals are sequentially projected onto the screen.

2 Claims, 10 Drawing Sheets

PROJECTOR WITH UV LIGHT SOURCE

BACKGROUND OF THE INVENTION (1) Field of the Invention

This invention relates to fight sources for projectors, in particular to light sources using ultraviolet light sources.

(2) Brief description of Related Art

Figure 1:
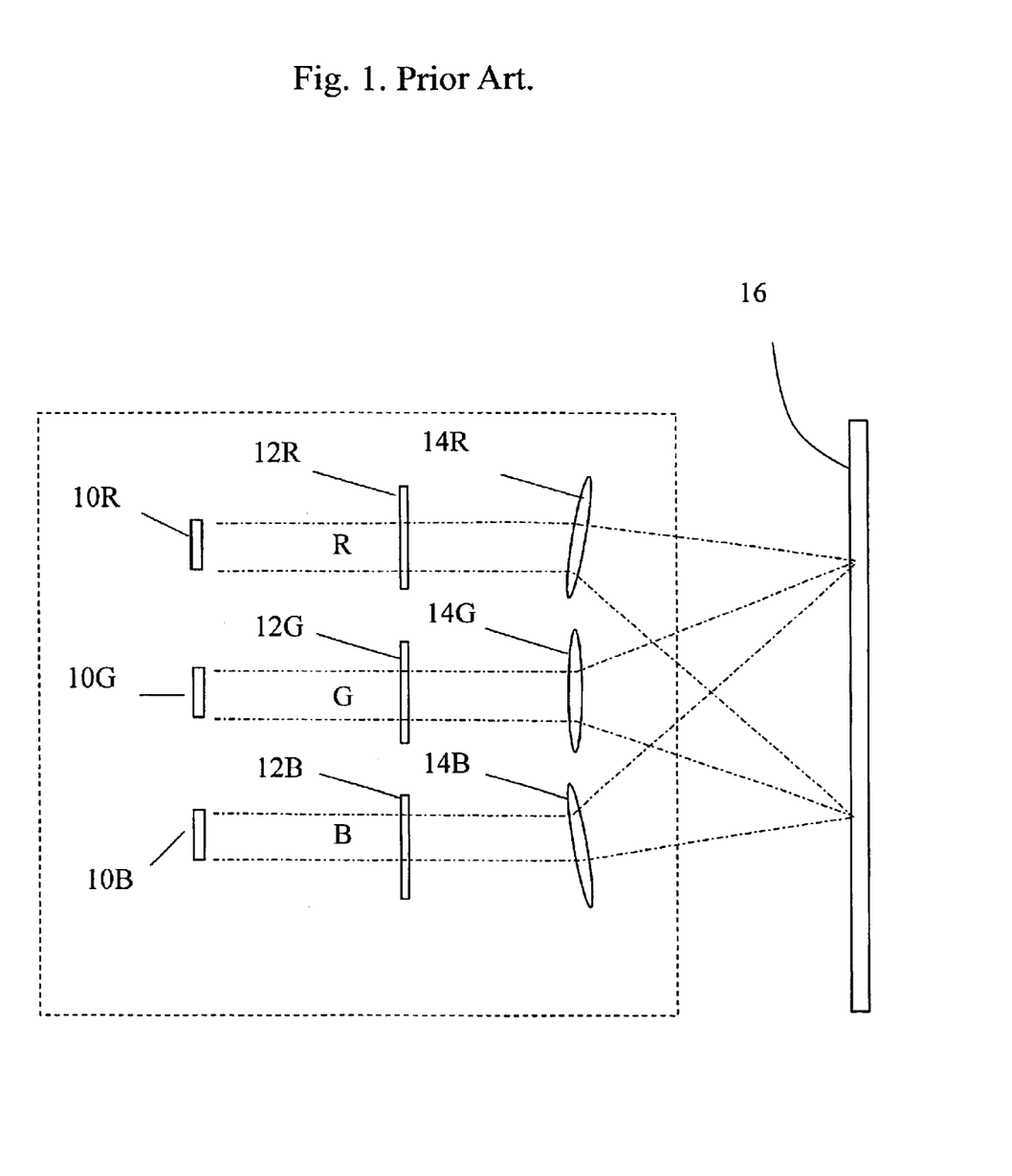
FIG. 1 shows a prior art tri-color light source module for a projection system.

A prior art light source for a projector is shown in FIG. 1, as described in the co-pending U.S. patent application Ser. No. 10/139,780

FIG. 1 shows the basic unit of a matrix of light emitting diodes (LED) to form the light source cell of a color picture projector. Three primary color red R), green(G), blue (B) LED packages are mounted in a matrix formation in a module as a three-gun light emitting light source. The R, G, B LEDs 10R, 10G, 10B emit individually light beams through three transmissive liquid crystal plates 12R, 12G, 12B and then through three lens system 14R, 14G, 14B, respectively. The transmission through the liquid crystal plates are each controllable. The lens system 14R, 14G and 14B are tilted to focus the three R, G, B light beams to the spot on the projection picture screen 16 and form a single dot to the viewer. The appearance is the same as the dot-matrix display on an ordinary computer monitor. The transmissions through the crystal liquid plates 12R, 12G, 12B vary with time to form a motion picture.

In this prior art, three different kinds of LEDs are needed. The cost is high both initially and during maintenance.

SUMMARY OF THE INVENTION

An object of this invention is to reduce the cost of light sources for a projection system. Another object is to reduce the maintenance cost of the light sources.

These objects are achieved by replacing the different color light sources with ultraviolet (UV) light emitting diodes. These UV are used to activate red, green and blue fluorescent plates to emit red, green and blue light. The different color lights are transmitted through a programmable liquid crystal plate or reflected by a digital-micro-device (DMD) for a projector. The different color transmitted or reflected light beams can be projected simultaneously or sequentially.

DETAILED DESCRIPTION OF THE INVENTION

Figure 2:
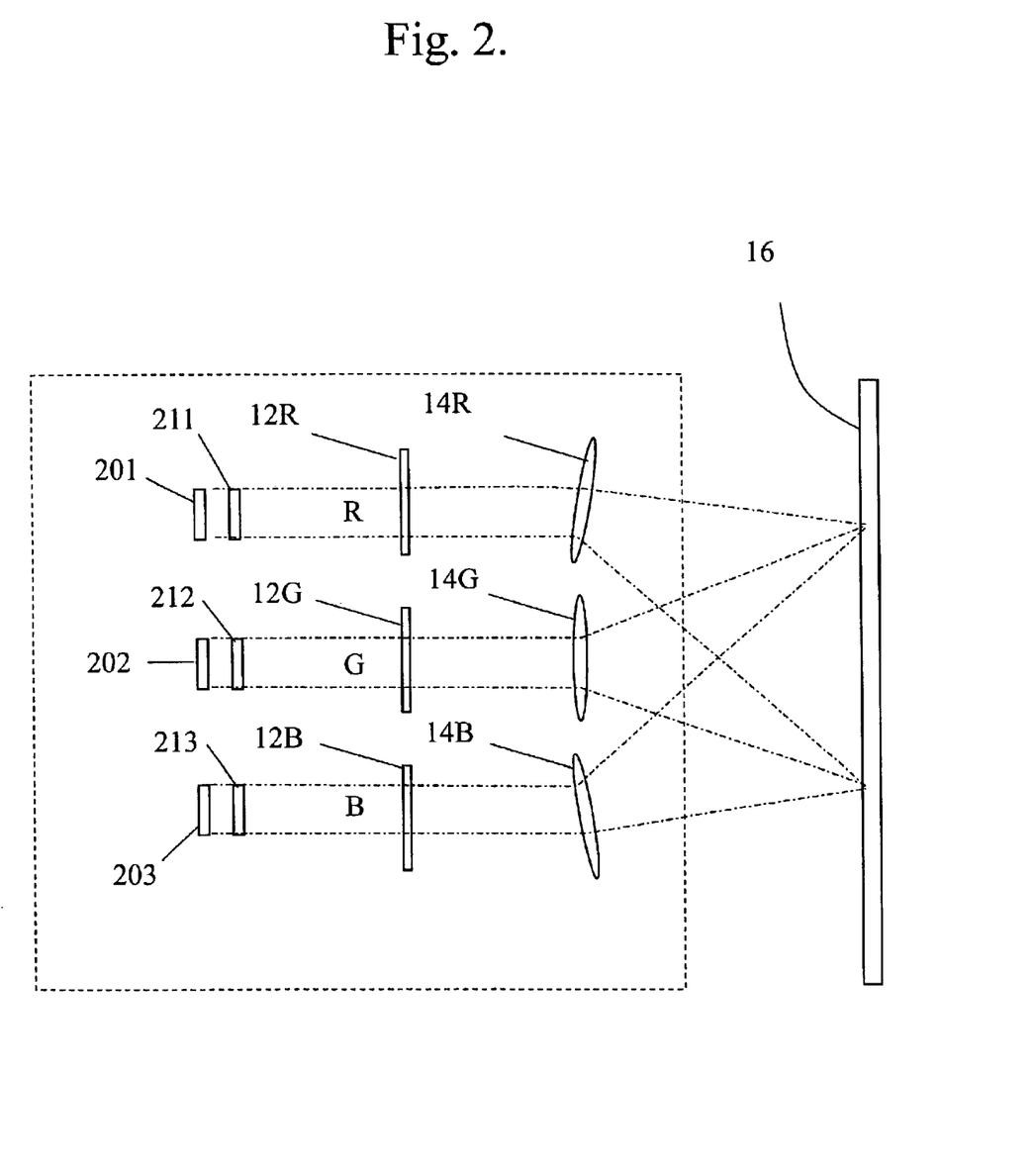
FIG. 2 shows a first embodiment of present invention using UV light sources for a color projection system using three UV light sources.

FIG. 2 shows the first embodiment of the present invention. Three UV light emitting diode (LED) chips finish three UV light sources 201, 202 and 203. A red fluorescent plate 211 converts the UV light from source 201 into red light; a green fluorescent plate 212 converts the UV light from source 202 into green light; and a blue fluorescent plate 213 converts the UV light from source 203 into blue light The red, green and blue light beams from the fluorescent plates, 211, 212, 213 beam through three transmissive liquid crystal plates 12R, 12G and 12B and the through three lens systems 14R, 14G and 14B, respectively. The transmissions through the liquid crystal plates are each controllable. The lens systems 14R, 14G and 14B are tilted to focus the three R, G, B light beans to the same spot on the projection picture screen 16 and form a single dot to the viewer. The transmission through the crystal liquid plates 12R, 12G and 12B varies with time to form a motion picture.

Figure 3:
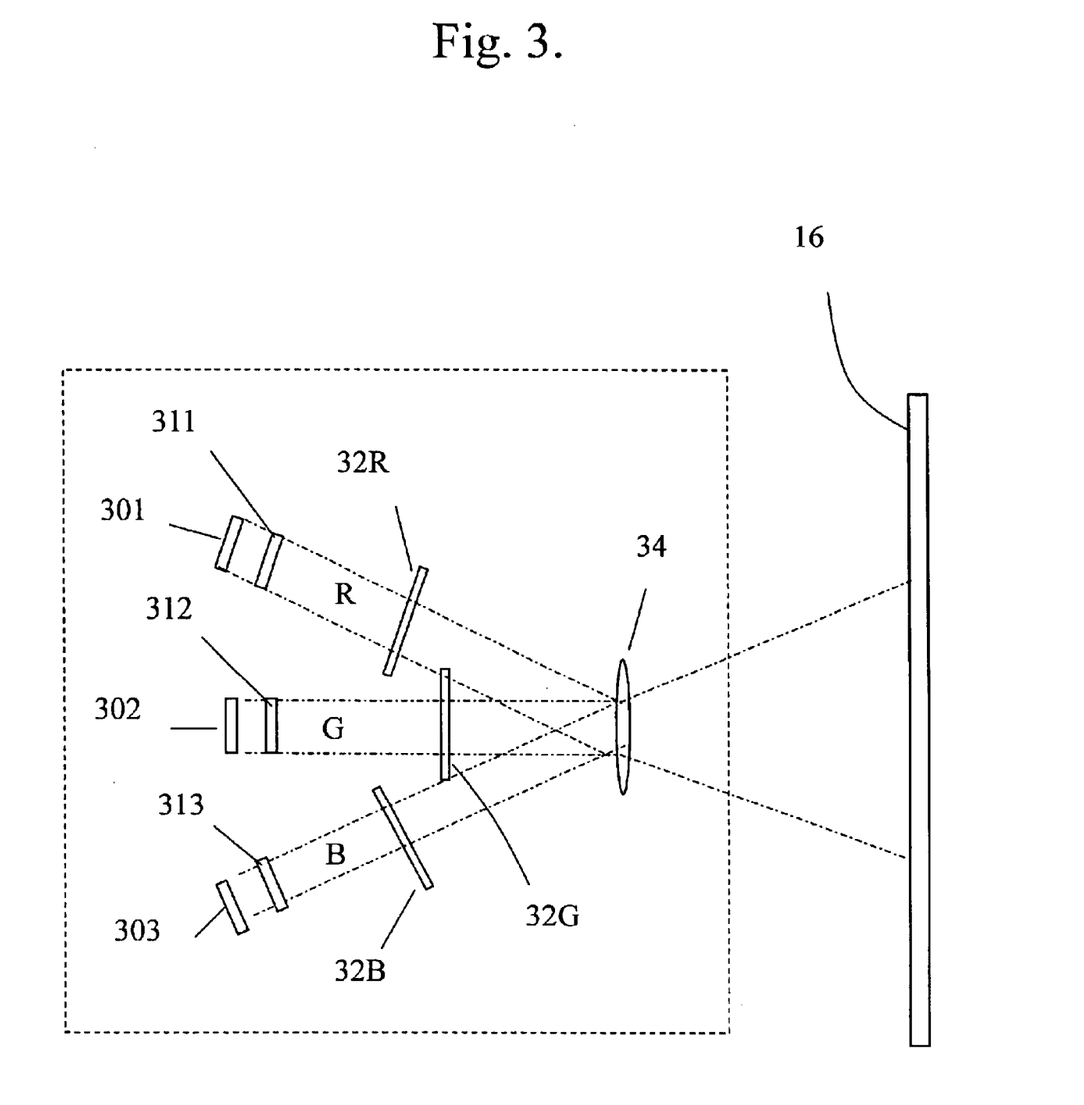
FIG. 3 shows a second embodiment of the present invention using UV light sources using three UV light sources to generate a merged light for projection.

FIG. 3 shows a second embodiment of the invention. Three UV diodes furnish three UV light sources 301, 302, 303, which are transmitted through red, green and blue fluorescent plates 311, 312, 313 to produce red (R), green (G) and blue (B) light beams, respectively. The red light source 301, the green light source 302 and the blue light source 303 pixels and their corresponding fluorescent plates 311, 312, 313 are oriented differently to beam the emitted lights through three controllable liquid crystal plates 32R, 32G and 32B respectively toward a common focusing lens 34. The light beams merging from the focusing lens 34 are projected on a screen 16 to reproduce a picture. Compared with FIG. 2, this optical system requires only one focusing lens system instead of three focusing lens systems.

Figure 4:
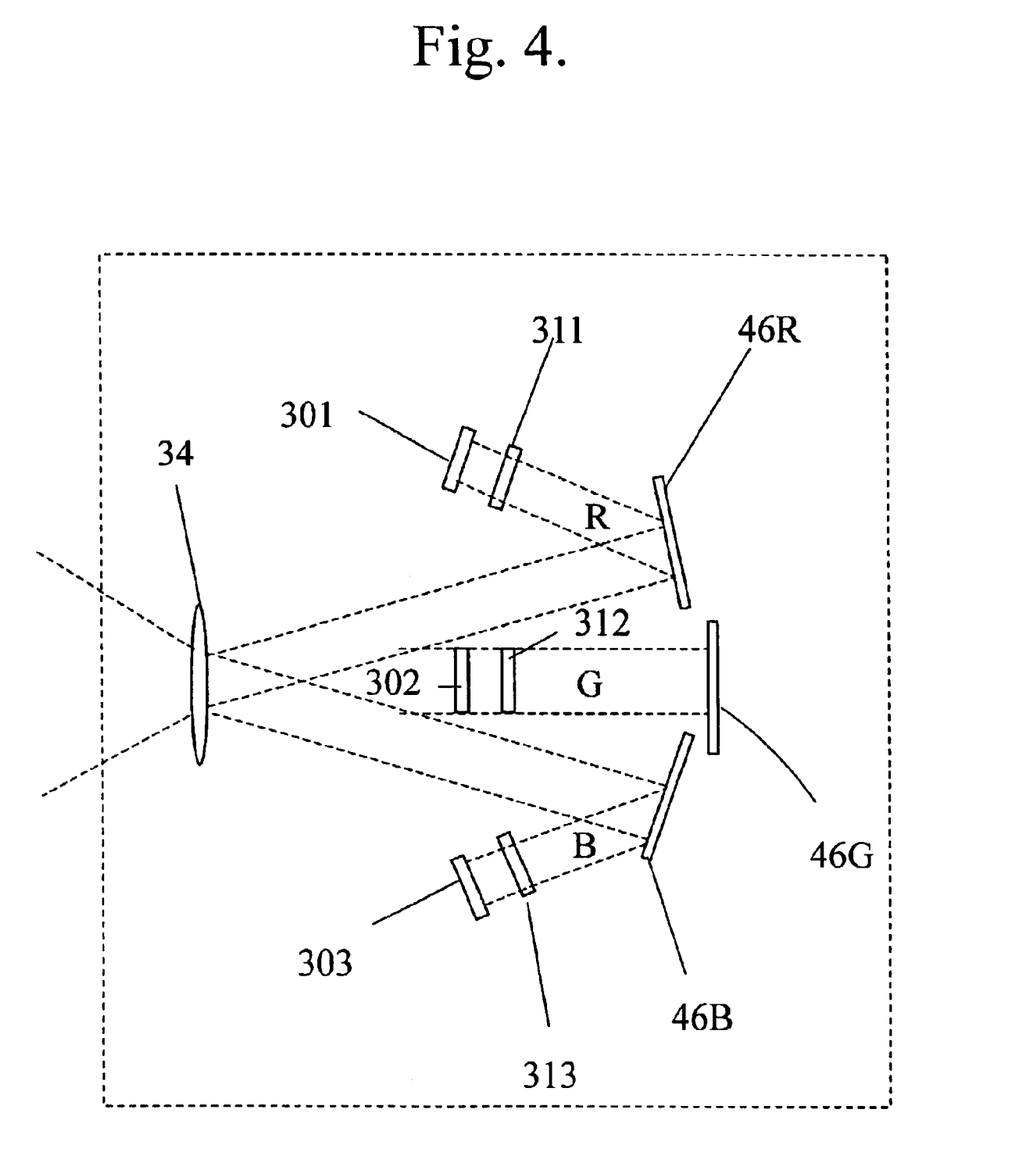
FIG. 4 shows a third embodiment of the present invention using a DMD to reflect a merged light for projection.

FIG. 4 shows a third embodiment of the present invention. The UV light sources 301, 302, 303 and respective red, green and blue fluorescent plates are similar to that in FIG. 3. However, the R, G, B light beams from the fluorescent plates are reflected by a "Digital Micro-mirror Devices, DMD" or reflective liquid crystal plates 46R, 46G and 46B. The DMD controls the amount of reflection according to input information. The reflected lights from the DMDs 46R, 46G, 46B are merged at a focusing lens system 34 and projected on a screen.

Figure 5:
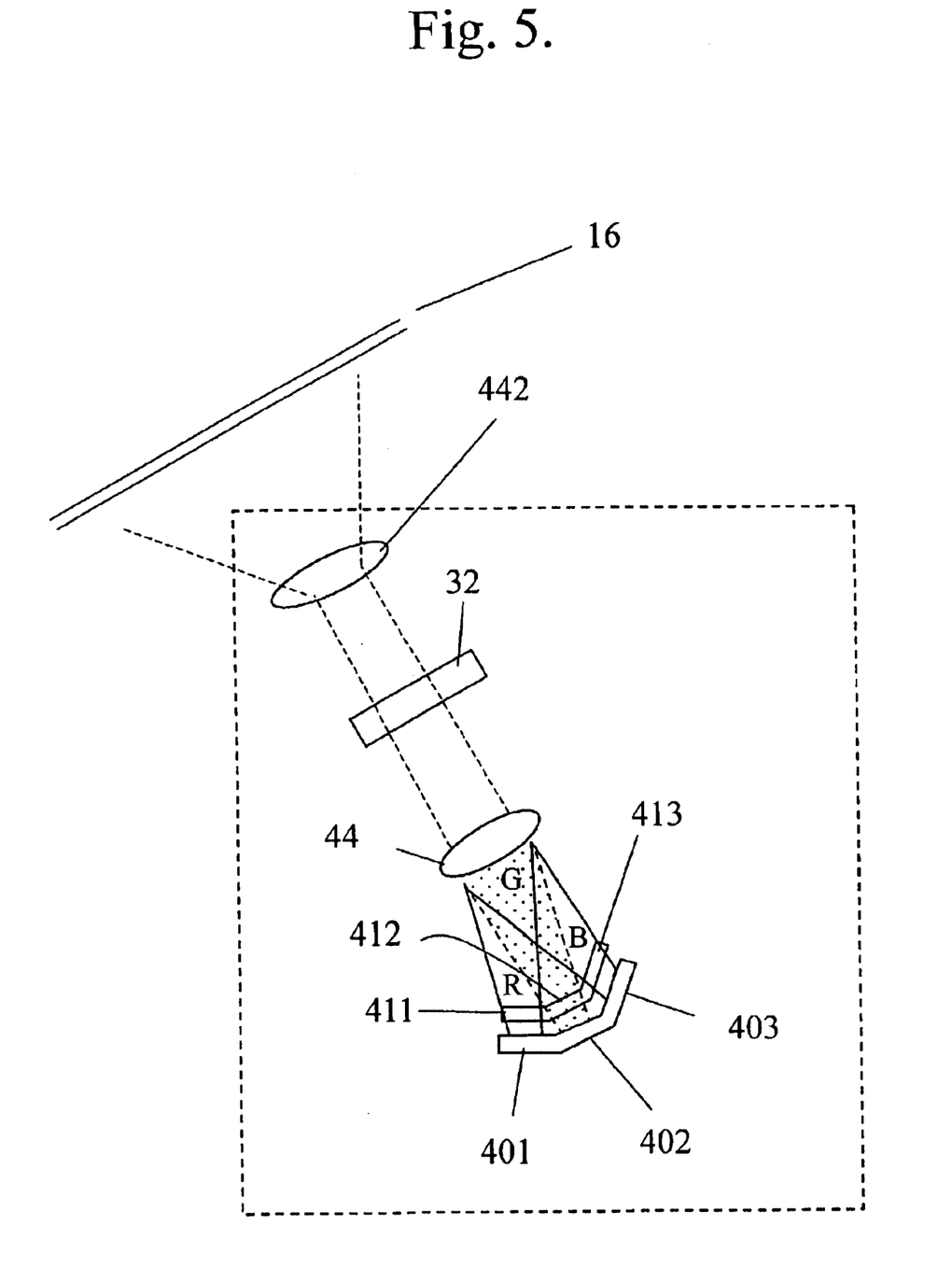
FIG. 5 shows a fourth embodiment of the present invention using a programmable liquid crystal plate to generate sequential color light beam for projection.

FIG. 5 shows a fourth embodiment of the present invention. Three UV light sources 401, 402, 403 are at oblique with respect to each other and beam through red, green and blue fluorescent plates 411, 412, 413 parallel to respective UV light sources to produce red R, green G and blue B light beans. The R, C, B light beams are merged at lens 44 to produce a parallel light beam for transmission through a liquid crystal plate 32, which sequentially controls the amount of transmission of individual colors for projection on a screen 16 through a convex lens system 442.

Figure 6:
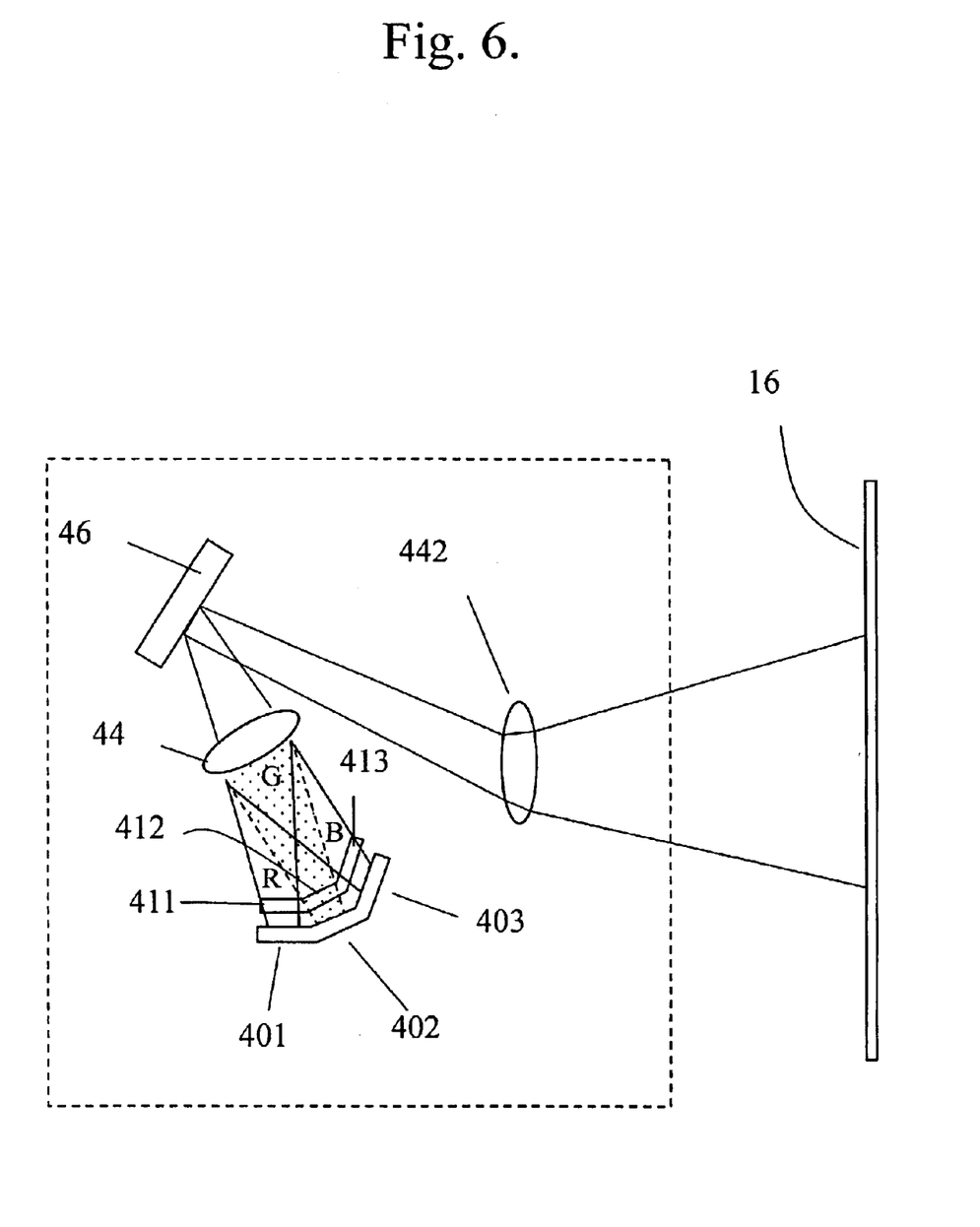
FIG. 6 shows a fifth embodiment of the present invention using a programmable DMD to reflect sequential color light beam for projection.

FIG. 6 shows a fifth embodiment of the present invention. The UV light sources 401, 402, 403 and the parallel fluorescent plates 411, 412, 413 are similar to that in FIG. 5 in producing the R, G and B light beams. However, the merged light beam after the lens system 44 is reflected by a DMD 46 for projection on a screen 16 through a convex lens system 442. The DMD 46 sequentially control the amount of transmission of individual colors.

Figure 7:
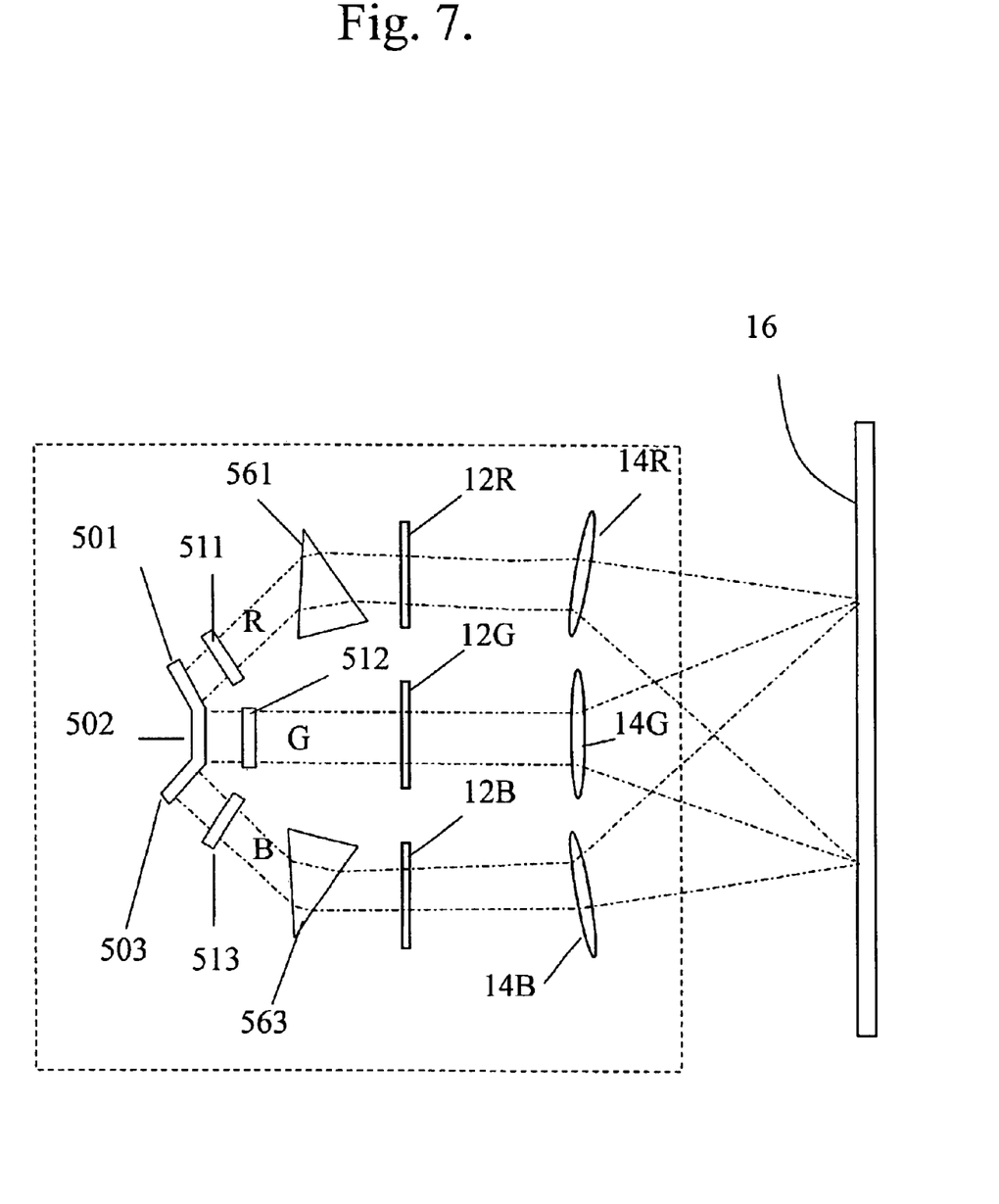
FIG. 7 shows a sixth embodiment of the present invention using prisms to deflect three divergent UV light sources.

FIG. 7 shows a sixth embodiment of the present invention. Three UV light sources 501, 502 and 503, bent with respect to each other, and three corresponding parallel fluorescent plates 511, 512 and 513 are used to produce three divergent R, G and B light beams. The emitted red light beam R is bent by prism 561 and the emitted blue light B is bent by prism 563, so that the red light beam, the green light beam and the blue light beam become parallel when they are transmitted past the respective programmable liquid crystal control plates 12R, 12G, 12B and focused by respective focusing lens systems 14R, 14G, 14B. The focusing lens system 14R and 14B are tilted so that the focused tri-color light beam merged together on the projection screen 16. As the liquid-crystal plate programs change with picture content, a motion picture is displayed on the screen.

Figure 8:
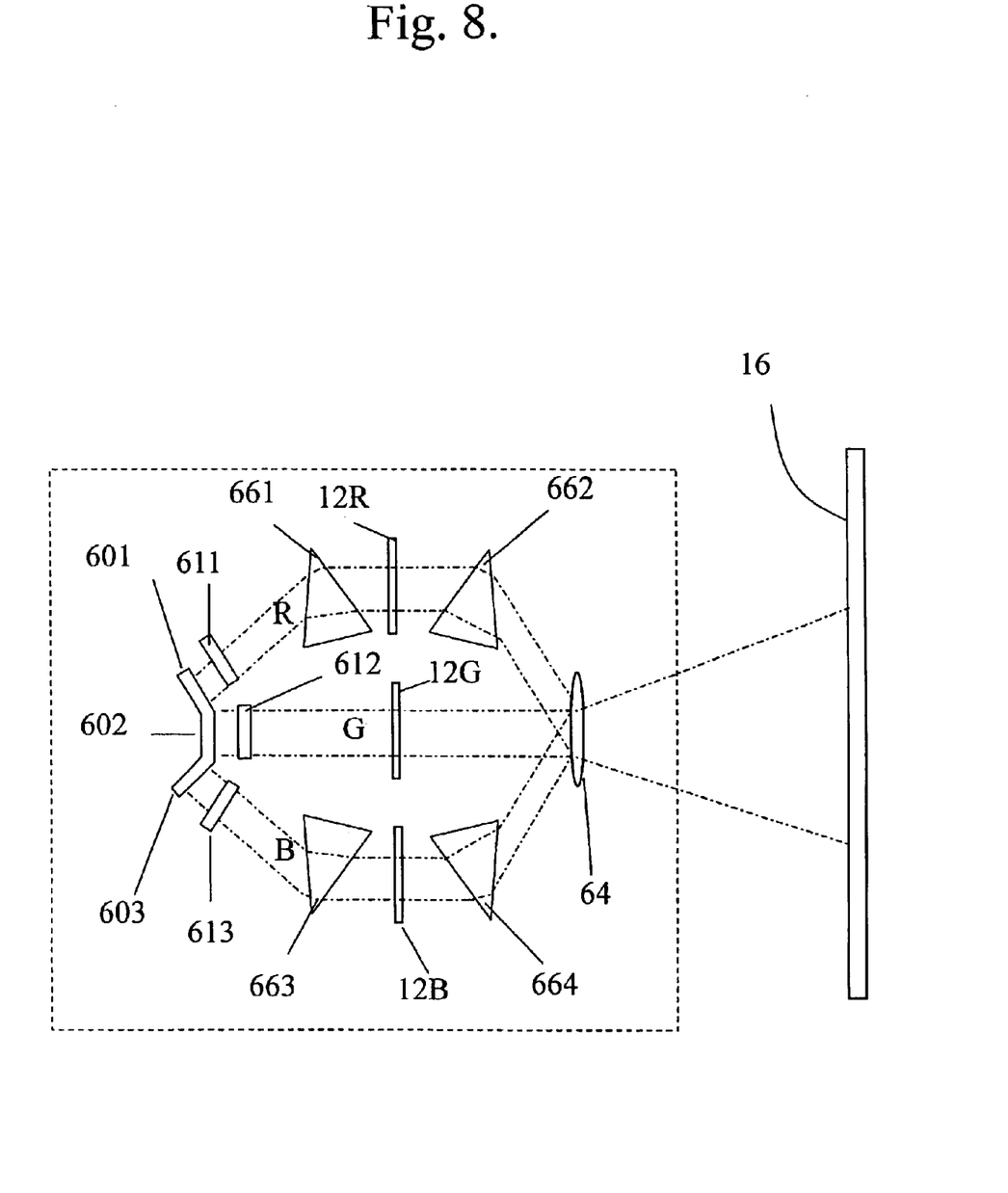
FIG. 8 shows a seventh embodiment of the present invention using two prisms in the red color path and two prisms in the blue color path to merge the three color light beams at the lens for projection unto a screen.

FIG. 8 shows a seventh embodiment of the present invention. The divergent UV light sources 601, 602, 603 and their corresponding color fluorescent plates 611, 612, 613 are similar to that in FIG. 7. The red light beam R is bent by prism 661, transmitted through a programmable liquid crystal plate 12R, and bent again by prism 662 to merge with the green light beam through the programmable liquid crystal plate 12G at the focusing lens system 64. Similarly the blue light beam B is bent by prism 663, transmitted through a programmable liquid plate 12B, and bent again by prism 664 to merge with the green light beam through the liquid crystal plate 12G at the focusing lens 64. The focused merging light is then projected on a screen 16 to produce a spot of a picture. As the liquid crystal programs change, the picture becomes a motion picture.

Figure 9:
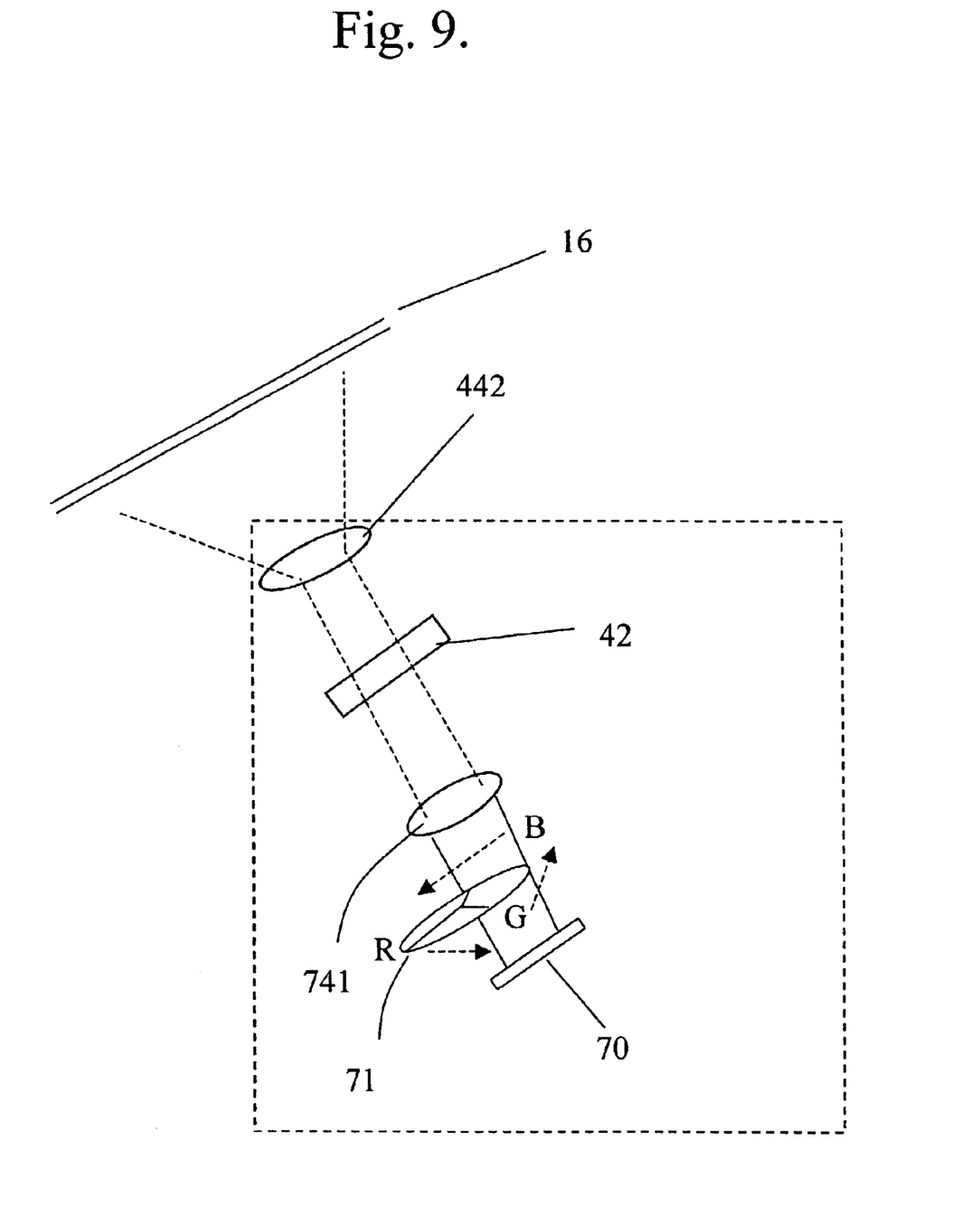
FIG. 9 shows an eighth embodiment of the present invention using a rotating three color fluorescent plate to sequentially project a color picture through a programmable liquid crystal plate.

FIG. 9 shows an eighth embodiment of the present invention. The projection system is similar to that in FIG. 5 except that a single UV light source 70 is used. A rotating fluorescent plate 71 is inserted between the UV light source and the first lens system 741. The rotating fluorescent plate 71 has three sections: a red section to emit a red light R, a green section to emit a green light G and a blue section to emit a blue light. Thus, the light emerging from the lens system 42 sequentially generates red, green and blue colors to transmit through the programmable liquid plate 42. The light transmitted through the liquid plate 42 is projected on a screen through a convex lens system 442.

Figure 10:
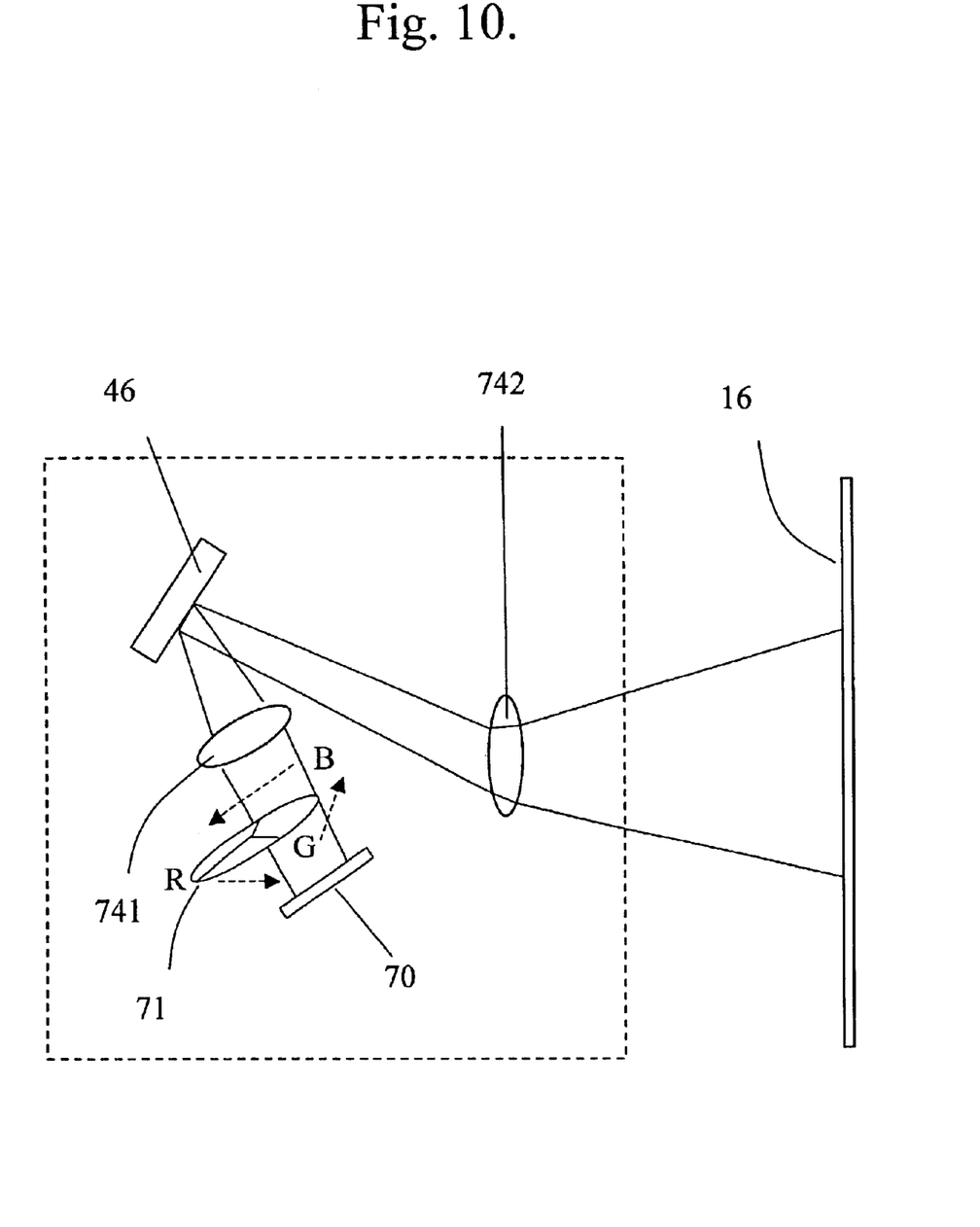
FIG. 10 shows a ninth embodiment of the present invention using a rotating three color fluorescent plate to sequentially project a color picture through a reflective DMD.

FIG. 10 shows a ninth embodiment of the present invention. The projection system is similar to that in FIG. 9 except that a reflection type DMD 46 is used instead of a transmission type liquid crystal plate 42 in FIG. 9. A single UV light source 70 is used. A rotating fluorescent plate 71 is inserted between the UV light source and the first lens system 741. The rotating fluorescent plate 71 has three sections: a red section to emit red light R, a green section to emit a green light G and a blue section to emit blue light. Thus, the light emerging from the lens system 42 sequentially generates red, green and blue colors to be reflected by the programmable DMD 46. The light reflected by the DMD is projected on a screen 16 through a convex lens system 742. The amount of reflection is programmable and controlled by the picture content. As the programs change, the projected picture becomes a motion picture.

While the preferred embodiments of the invention have been described, it will be apparent to those skilled in the art that various modifications may be made without departing from the spirit of the present invention. Such modifications are all within the scope of this invention.

What is claimed is:

1. A picture projection system comprising:

a light source having at least one ultraviolet (UV) light emitting diode (LED)chip;

a red fluorescent plate for emitting red light beam at the absorption of said UV light, a green fluorescent plate for emitting green light beam at the absorption of said UV light, and a blue fluorescent plate for emitting blue light beam at the absorption of said UV light;

a programmable control means to control the amount of transmitted light from each one of said red light, said green light and said blue light;

merging and focusing means to project the transmitted light onto a projection screen, wherein said control means is a programmable liquid crystal plate, and wherein one said UV LED chip each is placed behind cash said red fluorescent plate, said green fluorescent plate, and said blue fluorescent plate;

a first prism to deflect said red light beam before a first said programmable control means, a second prism to defect said blue light beam before a second said programmable control means;

a third said programmable control means the path of said green light beam;

a first focusing lens system for focusing said red light beam from said first programmable control means onto said projection screen;

a first focusing lens system for focusing said red fight beam from said first programmable control means onto said projection screen;

a second focusing lens system for focusing said blue light beam from said second programmable control means onto said projection screen; and a third focusing lens system for focusing said green light beam from said third programmable control means onto to said projection screen.

2. The picture projection system as described in claim 1 further comprising:

a third prism to deflect said red light beam after said first programmable liquid crystal plate toward a common focusing lens In for projecting onto said projection screen; and a fourth prism to deflect said blue light beam after said second programmable liquid crystal plate toward a common focusing lens system for projecting onto said projection screen.

* * * * *